Dec. 15, 1959     E. J. GORNOWSKI     2,917,453
HEAT CAPACITIES OF HYDROFORMING RECYCLE GAS
Filed Aug. 5, 1953
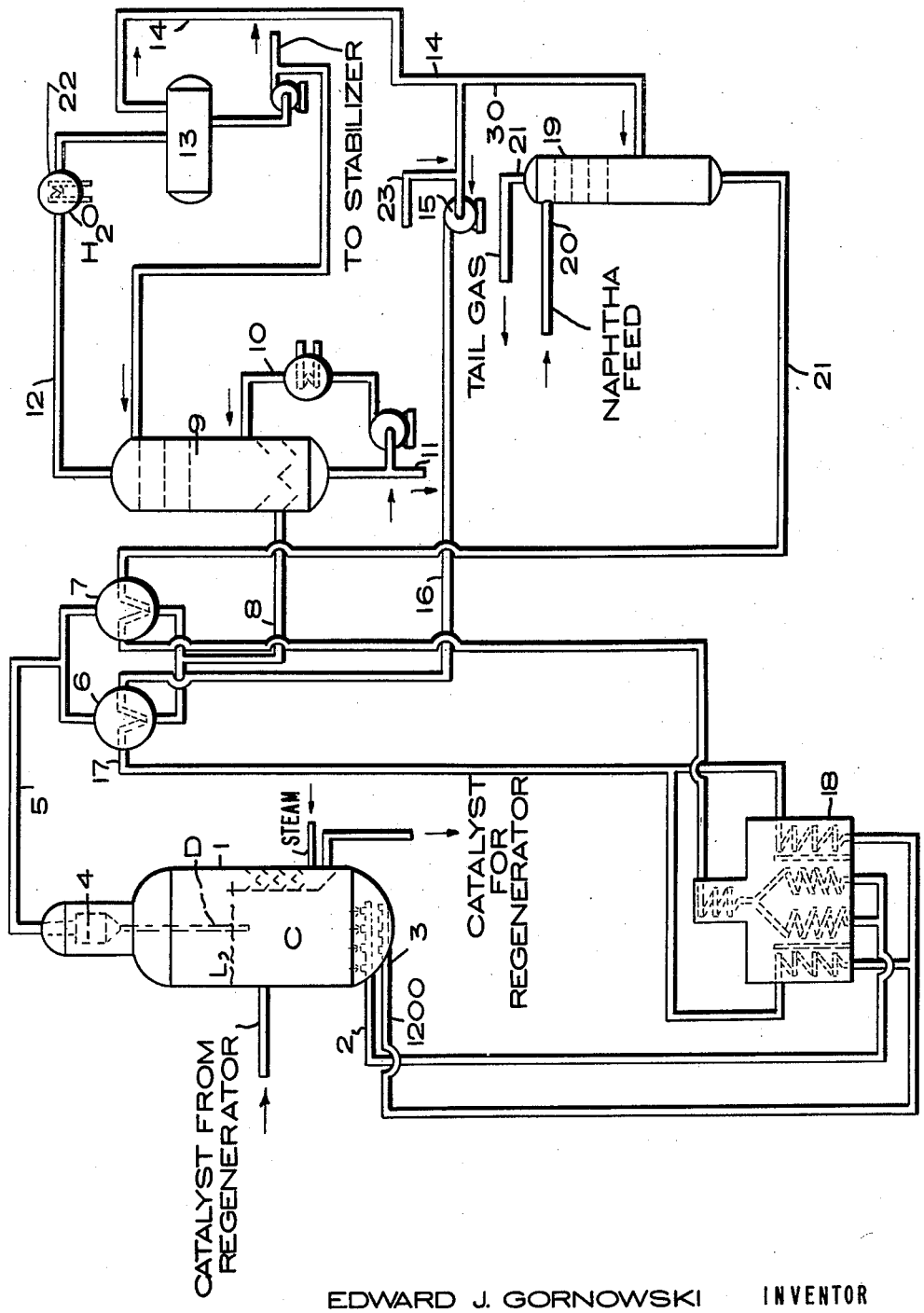
EDWARD J. GORNOWSKI    INVENTOR
BY J. Cashman    ATTORNEY

United States Patent Office 2,917,453
Patented Dec. 15, 1959

2,917,453

HEAT CAPACITIES OF HYDROFORMING RECYCLE GAS

Edward J. Gornowski, Cranford, N.J., assignor to Esso Research and Engineering Company, a corporation of Delaware Application August 5, 1953, Serial No. 372,441

2 Claims. (Cl. 208—134)

This invention relates to improvements in the hydroforming of naphthas. More particularly it relates to improvements in increasing the heat capacity of the recycle gas from a hydroforming operation.

Hydroforming is defined as an operation in which a petroleum naphtha is contacted at elevated temperatures and pressures and in the presence of added hydrogen with a solid catalytic material under conditions such that there is no net consumption of hydrogen. In the hydroforming operation it is necessary for best results to utilize a feed stock containing a substantial quantity of naphthenic hydrocarbons, e.g., about 20 to 50 volume percent, and usually the feed stock boils substantially within the range of from about 200°–350° F. The light ends, i.e., the material boiling from about 0°–200° F., is not subjected to this reaction, for the reason that the virgin naphtha light ends have a fairly good octane rating. The feed or charging stock to the hydroforming reactor can be a virgin naphtha, a cracked naphtha, a Fischer-Tropsch naphtha, a mixture of these, or the like.

Hydroforming operations are ordinarily carried out in the presence of hydrogen or hydrogen-rich recycle gas at temperatures of 750°–1150° F. in the pressure range of about 50 to 1000 pounds per square inch, and in contact with such catalysts as molybdenum oxide, chromium oxide, or, in general, oxides or sulfides of metals of groups IV, V, VI, VII, and VIII of the periodic system of elements alone, or generally supported on a base or spacing agent such as alumina gel, precipitated alumina, or zinc aluminate spinel. A good hydroforming catalyst is one containing about 10 weight percent molybdenum oxide upon an aluminum oxide base prepared by heat treating a hydrated aluminum oxide or upon a zinc aluminate spinel.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha having an octane number of about 50 to a hydroformate having an octane number of from 95 to 98 and obtain yields of $C_5^+$ hydrocarbons as high as 85%.

It has been proposed in application Serial No. 188,236, filed October 3, 1950, now U.S. Patent No. 2,689,823, to effect the hydroforming of naphtha fractions in the presence of a dense fluidized catalyst mass in a fluidized solids reactor system in which naphtha vapors are passed continuously through the dense, fluidized bed of hydroforming catalyst particles in a reaction zone, spent catalyst particles being withdrawn from the dense bed in the reaction zone and passed to a separate regeneration zone where fouling, inactivating carbonaceous deposits are removed by combustion, whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

One of the main problems in carrying out a hydroforming operation is that of supplying heat to support the highly endothermic reaction. Some heat can be supplied to the reaction zone in the preheating of the oil feed. Since the naphthenes contained in the feed are subject to thermal cracking if the preheat temperature exceeds about 1000° F., there is a limitation on the amount of heat that may be added in this manner.

Another method of adding heat to the reactor is through the sensible heat contained in the hot regenerated catalyst. However, since hydroforming catalysts as a class are injured when heated to temperatures appreciably above 1200° F., there is a further limitation on the amount of heat that can be transferred from the regenerator to the reactor by the hot regenerated catalyst. Furthermore, with respect to adding heat by means of a hot regenerated catalyst, it is pointed out that the catalyst to oil ratio, in other words, the weight of catalyst per weight of oil which may be transferred to the reactor from the regeneration, is limited to about 1 for high severity operations, because catalyst to oil ratios above 1 result ordinarily in the formation of excessive coke.

Another way to supply heat to the reaction zone is by high recycle gas rates, heating the hydrogen-containing gas to a temperature of 1100°–1250° F. However, since the reaction products are usually cooled to about 100° F. before the hydrogen is separated therefrom, the cost of reheating this recycle gas is quite expensive. Also, temperatures above 1200° F. cause excessive thermal cracking of the $C_4^+$ hydrocarbons present in the recycle gas stream.

The present invention provides an improved method for supplying heat to the reaction zone. The method comprises increasing the heat capacity of the recycle gas, thereby making it possible to supply more heat of reaction with a given gas volume, or, if desired, to decrease the gas preheat temperature rate for a given heat input. The several ways of increasing gas heat capacity are as follows.

One way of increasing the heat capacity is to raise the temperature at which the scrubbed reactor product is separated into the hydrogen-containing recycle gas and hydroformate liquid product to the stabilizer.

In the usual method of refinery operation the product gases are cooled to the lowest temperature practically obtainable with the available cooling water. For instance, in a Gulf Coast location where 87° F. cooling water is available, the conventional design temperature for the gas separator would be 105° F. The tabulation below indicates how the heat capacity of the recycle gas increases when the separator temperature is increased as taught by this invention.

| | | | |
|---|---|---|---|
| Separator Pressure, lb. in.² gauge | 185 | 185 | 185 |
| Separator Temperature, ° F | 105 | 120 | 140 |
| Heat Capacity of Recycle Gas at 1,050° F., B.t.u./mol×° F | 14.5 | 15.2 | 16.4 |
| Gas Composition, Mol Percent: | | | |
| $H_2$ | 66.8 | 65.6 | 63.7 |
| $C_1$ | 14.2 | 14.0 | 13.7 |
| $C_2$ | 8.3 | 8.4 | 8.4 |
| $C_3$ | 5.3 | 5.6 | 5.9 |
| $C_4$ | 2.8 | 3.1 | 3.7 |
| $C_5$ | 1.5 | 1.8 | 2.3 |
| $C_6^+$ | 1.1 | 1.5 | 2.3 |

The higher separation temperature utilized results in more hydrocarbons being present in the recycle gas phase, and the gas consequently has a higher heat capacity.

In a situation where excessive recycle gas preheat temperatures would be required for heat balance, use of this invention would permit lowering the preheat furnace outlet temperature for a given quantity of heat supplied by the gas. For instance, if for a reaction temperature of 900° F. a preheat temperature of 1200° F. were required for a recycle gas flowing from a 105° F. separator, the preheat temperature could be lowered 24° F. without changing the heat input into the reactor, by raising the separator temperature to 140° F. The actual temperature of separation employed depends on the pressure, composition of effluent, etc. The utilization of the term "elevated temperature" connotes the raising of the separation temperature to increase the hydrocarbon content of the recycle gas.

The thermal cracking in the recycle furnace actually is decreased because the higher heat capacity permits of lower preheat temperatures.

Another way of increasing the hydrocarbon content of the recycle gas, and therefore its heat capacity, is through scrubbing of the tail gas by the naphtha feed at pressures from 50 to 500 p.s.i.g. This scrubbing of the tail gas also results in additional $C_4$ and $C_5$ being present in the feed and consequently increases the available sensible heat of the feed. The tail gas is that portion of the gas flowing from the product gas-liquid separator which must be purged to maintain the pressure on the system at a constant value. The tabulation below shows how the recycle gas composition and heat capacity is changed when the tail gas is scrubbed.

|  | Tail Gas Not Scrubbed With Naptha Feed | Tail Gas Scrubbed With Naphtha Feed |
|---|---|---|
|  | (Separator 105° F.—500 p.s.i.g.) | |
| Recycle Gas Heat Capacity at 1,050° F., B.t.u./mol×° F. | 10.2 | 10.8 |
| Recycle Gas Composition, Vol. Percent: | | |
| $H_2$ | 85.6 | 83.3 |
| $C_1$ | 6.9 | 7.0 |
| $C_2$ | 2.9 | 3.7 |
| $C_3$ | 2.7 | 4.1 |
| $C_4$ | 1.0 | 1.0 |
| $C_5$ | 0.3 | 0.3 |
| $C_6+$ | 0.6 | 0.6 |
|  | 100.0 | 100.0 |

Still a third means of increasing the heat capacity of the recycle gas is through the addition of light hydrocarbons, e.g., $C_1$ to $C_3$, to the recycle gas directly. This method is of particular interest in processes utilizing noble metal catalysts, e.g., platinum. In these processes substantially pure hydrogen is produced so that the heat capacity of the recycle gas at process conditions is about 8 to 10 B.t.u./mol×° F. If, for instance, 30 volume percent $C_3H_8$ on recycle gas are added to the $H_2$, the heat capacity of the recycle gas is increased to 17 to 18.5 B.t.u./mol×° F., thereby doubling the heat capacity of the gas. This means, of course, that for a given heat input the gas rate would be less than halved or the preheat temperature appreciably decreased.

This invention will be better understood by reference to the flow diagram shown in the drawing.

Referring in detail to the drawing, 1 represents a reaction zone which contains a bed of fluidized, powdered hydroforming catalyst C extending from the bottom of the vessel to an upper gas phase level L. The virgin naphtha to be reformed, after suitable heat exchange and heating, is sent through line 2 in the vaporized form into a lower portion of the bed of catalyst C in the reaction zone 1. Simultaneously recycle gas at a temperature of about 1200° F. is charged through line 3 into the bottom of reactor 1. The gasiform material, i.e., the vaporized oil and the hydrogen-containing gas, pass upwardly through the bed of catalyst at a superficial velocity of from about ½ to 3 feet per second, whereby a dense turbulent fluidized mass of catalyst is obtained, extending to L. Under conditions more fully set forth below, the desired conversion takes place and the crude product is withdrawn from the dense bed and passed upwardly through a dilute phase suspension of catalyst and gasiform material, which dilute phase extends from L to the top of the reactor. During the course of the reaction in reactor 1 carbonaceous solids are laid down on the catalyst and it is necessary to regenerate the latter. Before the crude product is withdrawn from the reactor it is forced through one or more gas-solids separating devices 4 (one shown) wherein entrained catalyst is separated from the gases and returned to the dense bed through one or more dip pipes D. The crude product is withdrawn overhead from the reactor through line 5, thence passed through coolers 6 and 7, wherein it can be cooled by heat exchange with cold feed to preheat the latter and/or recycle gas. The cooled product is withdrawn from coolers 6 and 7 via line 8 and thence charged into a scrubber 9.

A heavy oil is charged to scrubber 9 through line 10 and passes downwardly countercurrent to the upflowing gasiform material charged to the scrubber via line 8. The heavy oil cools the vapors sufficiently to condense heavy polymer, which is rejected from the system through line 11. The amount of this heavy polymer material is usually not more than about 2 volume percent based on feed.

The uncondensed material is withdrawn overhead from scrubber 9 through line 12 and thence passed after cooling into a separation drum 13. The separation in the separation drum is conducted under such conditions that a bottoms liquid hydroformate product to stabilizer is taken off.

Under ordinary circumstances the cooling before separation, for instance in a Gulf Coast location, would result in a separator temperature of 105° F. According to the disclosure herein, this separation is carried out at say 140° F. to increase the hydrocarbon content of the recycle gas and thereby its heat capacity. This can be done simply by decreasing the cooling water rate to cooler 22. If further increase in heat capacity were desired, propane or mixtures of $C_1$ to $C_3$ hydrocarbons could be added through line 23.

The recycle gas from the separator is passed through line 14 to recycle compressor 15. The recycle gas passes through recycle compressor 15 and then through line 16 to heat exchanger 6 and then through line 17 into furnace 18, and finally back to reactor 1. A residual portion of the recycle gas is passed through line 30 into absorber 19 wherein the gas is stripped free of $C_4$ and $C_5$ hydrocarbons by feed entering through line 20. The absorber can be followed by a sponge oil scrubber to remove the higher components. The feed enriched with $C_4$ and $C_5$ components is withdrawn from the bottom of absorber 19 through line 21, heat exchangers 7, furnace 18, and thus back to reactor 1. Dry gas is withdrawn overhead from absorber 19 through line 21.

Since during hydroforming operations the catalyst in the reactor becomes contaminated with carbonaceous and other deposits, it can become necessary to regenerate the catalyst. This is done in a manner known in the art, e.g., the catalyst is withdrawn from the reactor and conducted into a regenerator. In the regenerator the gasiform oxygen-containing material removes the carbonaceous and other deposits from the catalyst by burning them off. The regenerated catalyst is then withdrawn from the regenerator and returned to the reactor.

It is possible that under some conditions it can be desirable to return the catalyst flowing from the regenerator to the reactor with a reducing gas. Under normal low sulfur conditions data indicate that it is desirable to operate without such a separation treatment. In special cases, such as when hydroforming a high sulfur feedstock, this reducing treatment can be desirable.

The figures below present a typical operation.

Example I

These data are presented in tabular form for more ready comprehension.

| Feed: | | | |
|---|---|---|---|
| Boiling Range, °F | 225–330 | 225–330 | 225–330 |
| Principal Crude Source | So. La. | La.-Miss. | No. La.-Ark. |
| Octane No.—CFRR Clear | | 50 | |
| Gravity, °API | | 55 | |
| Aromatics, Vol. Percent | 8.7 | | |
| Naphthenes, Vol. Percent | 37.5 | | |
| Paraffins, Vol. Percent | 53.8 | | |
| Catalyst: 10% $MoO_3$ on $Al_2O_3$. | | | |
| Separator Temperature, °F | 105 | 120 | 140 |
| Separator Pressure, lb. in.² gauge | 185 | 185 | 185 |
| Recycle Gas Composition, Vol. Percent: | | | |
| $H_2$ | 66.8 | 65.6 | 63.7 |
| $C_1$ | 14.2 | 14.0 | 13.7 |
| $C_2$ | 8.3 | 8.4 | 8.4 |
| $C_3$ | 5.3 | 5.6 | 5.9 |
| $C_4$ | 2.8 | 3.1 | 3.7 |
| $C_5$ | 1.5 | 1.8 | 2.3 |
| $C_6+$ | 1.1 | 1.5 | 2.3 |
| Heat Capacity, B.t.u./mol. × °F | 14.5 | 15.2 | 16.4 |

Reactor:
- Temperature ---------------- 900° F.
- Pressure, p.s.i.g. ------------ 200.
- Catalyst/oil ratio ------------ 0.9.
- Space velocity, w./hr./w. ---- 0.21.
- Catalyst bed density -------- 35 lb./ft.³
- Gas velocity/steam stripping -- 0.8 ft./sec.

Regenerator:
- Temperature ---------------- 1125° F.
- Pressure, p.s.i.g. ------------ 194.
- Heat removal --------------- 2300 B.t.u. per bbl. feed.
- Bed density ---------------- 35 lb./ft.³

Products:
Yields—
- $H_2$ ----------------------- 1.9 wt. percent on feed.
- $C_1/C_3$ ------------------ 11.9 wt. percent on feed.
- $C_4$ ----------------------- 7.0 vol. percent on feed.
- $C_5$ ----------------------- 5.3 vol. percent on feed.
- Polymer ------------------- 0.3 vol. percent on feed.
- $C_5$–430°FVT—
  - CFR-R clear ------------ 98.
  - Yield --------------------- 74.5 vol. percent on feed.
  - Gravity ------------------ 43.7° API.
  - Aromatics --------------- 54.6 vol. percent.

Example II

This example illustrates an analysis and heat capacities for two batches of recycle gas, one in which the recycle gas was scrubbed with feed as taught in this invention, and the other having no such treatment. The results are tabulated below:

| Tail Gas Scrubbed with Feed | No | Yes |
|---|---|---|
| Recycle Gas Analysis, Mol Percent: | | |
| $H_2$ | 66.90 | 58.52 |
| $C_1$ | 14.42 | 18.60 |
| $C_2$ | 8.45 | 9.53 |
| $C_3$ | 5.36 | 6.86 |
| $C_4$ | 2.84 | 4.37 |
| $C_5$ | 0.89 | 0.99 |
| $C_6$ | 0.62 | 0.60 |
| $C_7$ | 0.36 | 0.38 |
| $C_8$ | 0.14 | 0.13 |
| $C_9+$ | 0.02 | 0.02 |
| Mo. Wt. | 11.85 | 14.28 |
| Heat Capacity, B.t.u./Mol×°F | 14.0 | 15.8 |

This example clearly points out how an increase in heat capacity of almost 13% was obtained through the utilization of the features of this invention.

The advantages of the process of this invention reside in the fact that several ways of increasing gas heat capacity economically are provided. In addition, it is possible to add light hydrocarbons directly to the recycle gas to enhance the results. The process is applicable to a fixed bed as well as a fluidized process.

The fluidized reactor system is charged with a mass of finely divided hydroforming catalyst particles. Suitable catalysts for fixed bed and fluid operation include platinum and group VI metal oxides, such as molybdenum oxide, chromium oxide or tungsten oxide, or mixtures thereof upon a carrier such as activated alumina, zinc aluminate spinel, or the like. Preferred catalysts contain about 5 to 15 weight percent molybdenum oxide or from about 10 to 40 weight percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

It is to be understood that this invention is not limited to the specific examples, which have been offered merely as illustrations, and that modifications may be made without departing from the spirit of this invention.

What is claimed is:

1. In a catalytic process for hydroforming petroleum naphtha feeds wherein product vapors are cooled to condense the hydroformate and leave a recycle gas, the improved method of increasing the heat capacity of the recycle gas to at least 15.2 B.t.u./mol×°F. which comprises conducting the product vapor condensation at elevated temperatures of about 120° F. to 140° F. at a pressure of about 185 p.s.i.g., separating recycle gas from the liquid reaction products, heating the recycle gas to temperatures substantially above reaction zone temperature, and charging the preheated recycle gas to the hydroforming reaction zone.

2. In a catalytic process for hydroforming petroleum naphtha feeds wherein product vapors are cooled to condense the hydroformate and leave a recycle gas, the improved method of increasing the heat capacity of the recycle gas in the range of about 17 to 18.5 B.t.u./mol×°F. which comprises conducting the product vapor condensation at elevated temperatures of about 120° F. to 140° F. at a pressure of about 185 p.s.i.g., separating recycle gas from the liquid reaction products, increasing the volume of the hydrocarbon content in the recycle gas to above 30 volume percent by adding $C_1$–$C_3$ hydrocarbons to the recycle gas, heating the recycle gas to temperatures substantially above reaction zone temperature, and charging the preheated recycle gas to the hydroforming reaction zone.

References Cited in the file of this patent

UNITED STATES PATENTS

| | | |
|---|---|---|
| 2,345,487 | Liedholm et al. | Mar. 28, 1944 |
| 2,484,381 | Johnson et al. | Oct. 11, 1949 |
| 2,580,478 | Stine | Jan. 1, 1952 |
| 2,665,239 | Howard et al. | Jan. 5, 1954 |
| 2,696,460 | Hemminger | Dec. 7, 1954 |
| 2,758,065 | Halik | Aug. 7, 1956 |

OTHER REFERENCES

Maxwell: "Data Book on Hydrocarbons" (1950), pp. 75, 76, 88 and 89, Van Nostrand Co., publisher, New York.